(12) United States Patent
Honey et al.

(10) Patent No.: US 7,154,540 B2
(45) Date of Patent: Dec. 26, 2006

(54) SYSTEM FOR ENHANCING VIDEO

(75) Inventors: Stanley K. Honey, Palo Alto, CA (US); Richard H. Cavallaro, Mountain View, CA (US); Jerry Neil Gepner, Langhorn, PA (US); Edward Gerald Goren, Rolling Hills, CA (US); David Blyth Hill, Pacific Palisades, CA (US)

(73) Assignee: Fox Sports Productions, Inc., Los Angeles, CA (US)

( * ) Notice: Subject to any disclaimer, the term of this patent is extended or adjusted under 35 U.S.C. 154(b) by 619 days.

(21) Appl. No.: 09/844,524

(22) Filed: Apr. 27, 2001

(65) Prior Publication Data

US 2001/0026319 A1 Oct. 4, 2001

Related U.S. Application Data

(63) Continuation of application No. 09/627,106, filed on Jul. 27, 2000, now abandoned, which is a continuation of application No. 09/264,138, filed on Mar. 5, 1999, now Pat. No. 6,141,060, which is a continuation of application No. 08/735,020, filed on Oct. 22, 1996, now Pat. No. 5,917,553.

(51) Int. Cl.
*H04N 5/228* (2006.01)
*H04N 9/74* (2006.01)

(52) U.S. Cl. ..................... 348/222.1; 348/578

(58) Field of Classification Search ............... 348/578, 348/601, 222.1
See application file for complete search history.

(56) References Cited

U.S. PATENT DOCUMENTS

| | | | |
|---|---|---|---|
| 3,351,347 A | 11/1967 | Smith et al. | 473/199 |
| 3,580,993 A | 5/1971 | Sandorf et al. | 348/584 |
| 3,840,699 A | 10/1974 | Bowerman | 348/169 |
| 3,944,738 A | 3/1976 | Johnson | 348/157 |
| 3,973,239 A | 8/1976 | Kakumoto et al. | 382/275 |
| 4,064,528 A | 12/1977 | Bowerman | 348/578 |
| 4,067,015 A | 1/1978 | Mogavero et al. | 340/825.7 |

(Continued)

FOREIGN PATENT DOCUMENTS

DE 41 01 156 A1 1/1991

(Continued)

OTHER PUBLICATIONS

Replay 2000—The Ultimate Workstation for Sport Commentators and Producers, Orad Hi-Tec Systems, Apr. 1995.

(Continued)

*Primary Examiner*—Vivek Srivastava
*Assistant Examiner*—James M. Hannett
(74) *Attorney, Agent, or Firm*—Vierra Magen Marcus & DeNiro LLP

(57) ABSTRACT

Pan, tilt and zoom sensors are coupled to a broadcast camera in order to determine the field of view of the broadcast camera and to make a rough estimate of a target's location in the broadcast camera's field of view. Pattern recognition techniques can be used to determine the exact location of the target in the broadcast camera's field of view. If a preselected target is at least partially within the field of view of the broadcast camera, all or part of the target's image is enhanced. The enhancements include replacing the target image with a second image, overlaying the target image or highlighting the target image. Examples of a target include a billboard, a portion of a playing field or another location at a live event. The enhancements made to the target's image can be seen by the television viewer but are not visible to persons at the live event.

6 Claims, 6 Drawing Sheets

U.S. PATENT DOCUMENTS

| | | | | |
|---|---|---|---|---|
| 4,084,184 | A | 4/1978 | Crain | 348/116 |
| 4,179,704 | A | 12/1979 | Moore et al. | 348/579 |
| 4,319,266 | A | 3/1982 | Bannister | 348/587 |
| 4,386,363 | A | 5/1983 | Morrison | 348/587 |
| 4,413,273 | A | 11/1983 | Wischermann | |
| 4,420,770 | A | 12/1983 | Rahman | 348/589 |
| 4,490,741 | A | 12/1984 | Hornback | 348/550 |
| 4,521,196 | A | 6/1985 | Briard et al. | 434/20 |
| 4,541,013 | A | 9/1985 | Alpert | 348/601 |
| 4,591,897 | A | 5/1986 | Edelson | 348/589 |
| 4,612,666 | A | 9/1986 | King | 382/214 |
| 4,647,969 | A | 3/1987 | Graham, Sr. | 348/601 |
| 4,667,221 | A | 5/1987 | Cawley | |
| 4,674,125 | A | 6/1987 | Carlson et al. | 283/303 |
| 4,700,306 | A | 10/1987 | Wallmander | 348/116 |
| 4,739,406 | A | 4/1988 | Morton et al. | 348/578 |
| 4,811,084 | A | 3/1989 | Belmares-Sarabia et al. | 348/592 |
| 4,817,171 | A | 3/1989 | Stentiford | 382/195 |
| 4,897,726 | A | 1/1990 | Morton et al. | 348/578 |
| 4,924,507 | A | 5/1990 | Chao et al. | 382/211 |
| 4,950,050 | A | 8/1990 | Pernick et al. | 359/20 |
| 4,957,297 | A | 9/1990 | Newcomb et al. | 473/409 |
| 4,970,666 | A | 11/1990 | Welsh et al. | 345/423 |
| 4,975,770 | A | 12/1990 | Troxell | 348/157 |
| 4,995,090 | A | 2/1991 | Singh et al. | 382/213 |
| 4,999,709 | A | 3/1991 | Yamazaki et al. | 348/589 |
| 5,060,282 | A | 10/1991 | Molley | 382/211 |
| 5,063,603 | A | 11/1991 | Burt | 382/115 |
| 5,142,590 | A | 8/1992 | Carpenter et al. | 382/157 |
| 5,150,895 | A | 9/1992 | Berger | 473/467 |
| 5,179,421 | A | 1/1993 | Parker et al. | 356/139.06 |
| 5,184,820 | A | 2/1993 | Keating et al. | 473/588 |
| 5,207,720 | A | 5/1993 | Shepherd | 473/446 |
| 5,241,616 | A | 8/1993 | Garcia | 385/126 |
| 5,245,432 | A | 9/1993 | Jaffray et al. | 358/160 |
| 5,249,039 | A | 9/1993 | Chaplin | 348/587 |
| 5,264,933 | A | * 11/1993 | Rosser et al. | 348/578 |
| 5,268,734 | A | 12/1993 | Parker et al. | 356/139.06 |
| 5,274,716 | A | 12/1993 | Mitsuoka et al. | 382/210 |
| 5,305,107 | A | 4/1994 | Gale et al. | 348/590 |
| 5,313,304 | A | 5/1994 | Chaplin | 348/587 |
| 5,340,108 | A | 8/1994 | Gerpheide et al. | 473/156 |
| 5,346,210 | A | 9/1994 | Utke et al. | 473/415 |
| 5,353,392 | A | 10/1994 | Luquet et al. | 395/135 |
| 5,384,912 | A | 1/1995 | Ogrinc | |
| 5,388,825 | A | 2/1995 | Myers et al. | 473/570 |
| 5,392,088 | A | 2/1995 | Abe et al. | 396/79 |
| 5,398,075 | A | 3/1995 | Freytag et al. | 348/590 |
| 5,413,345 | A | 5/1995 | Nauck | 473/156 |
| 5,419,562 | A | 5/1995 | Cromarty | 473/269 |
| 5,419,565 | A | 5/1995 | Gordon et al. | 473/455 |
| 5,436,672 | A | 7/1995 | Medioni et al. | 348/591 |
| 5,459,529 | A | 10/1995 | Searby | |
| 5,459,793 | A | 10/1995 | Naoi et al. | 382/165 |
| 5,465,144 | A | 11/1995 | Parker et al. | 356/139.06 |
| 5,465,308 | A | 11/1995 | Hutcheson et al. | 382/159 |
| 5,469,512 | A | 11/1995 | Fujita et al. | 382/118 |
| 5,469,536 | A | 11/1995 | Blank | 345/431 |
| 5,479,597 | A | 12/1995 | Felloue | 395/154 |
| 5,488,675 | A | 1/1996 | Hanna | 348/590 |
| 5,491,517 | A | 2/1996 | Kreitman et al. | 348/581 |
| 5,500,684 | A | 3/1996 | Uya | |
| 5,508,737 | A | 4/1996 | Lang | 348/159 |
| 5,513,854 | A | 5/1996 | Daver | 273/454 |
| 5,524,065 | A | 6/1996 | Yagasaki | 382/226 |
| 5,543,856 | A | 8/1996 | Rosser | 348/589 |
| 5,564,698 | A | 10/1996 | Honey et al. | 473/570 |
| 5,566,251 | A | 10/1996 | Hanna | 348/589 |
| 5,592,236 | A | 1/1997 | Rosenbaum et al. | 348/586 |
| 5,610,653 | A | 3/1997 | Abecassis | 348/170 |
| 5,627,915 | A | 5/1997 | Rosser et al. | 382/219 |
| 5,668,629 | A | 9/1997 | Parker et al. | 356/139.05 |
| 5,808,695 | A | 9/1998 | Rosser et al. | 348/584 |
| 5,892,554 | A | * 4/1999 | DiCicco et al. | 348/584 |
| 5,912,700 | A | 6/1999 | Honey et al. | 348/157 |
| 5,917,553 | A | 6/1999 | Honey et al. | 348/578 |
| 5,953,076 | A | 9/1999 | Astle | |
| 6,100,925 | A | 8/2000 | Rosser | |
| 6,134,346 | A | 10/2000 | Berman | |
| 6,292,227 | B1 | 9/2001 | Wilf | |

FOREIGN PATENT DOCUMENTS

| | | |
|---|---|---|
| SU | 1659078 A1 | 6/1991 |
| WO | WO 95/10915 | 4/1995 |
| WO | WO 95/10919 | 4/1995 |

OTHER PUBLICATIONS

SailTrack, GPS Tracking System for Animated Graphics Broadcast Coverage of the America's Cup Races, 1992.
SailTrack Technical Overview, 1992.
Sail Viz Software Documentation, 1992.

* cited by examiner

SYSTEM FOR ENHANCING VIDEO

This application is a continuation of application Ser. No. 09/627,106, filed Jul. 27, 2000, now abandoned which is a continuation of application Ser. No. 09/264,138, filed Mar. 5, 1999, now U.S. Pat. No. 6,141,060, which is a continuation of Application No. 08/735,020, filed Oct. 22, 1996 now U.S. Pat. No. 5,917,553, all of which are incorporated herein by reference.

BACKGROUND OF THE INVENTION

1. Field of the Invention

The present invention is directed to a method and apparatus for enhancing a television broadcast of a live event.

2. Description of the Related Art

The television presentation of live events could be improved by enhancing the video in real time to make the presentation more interesting to the viewer. For example, television viewers cannot see the entire playing field during a sporting event; therefore, the viewer may lose perspective as to where one of the players or objects are on the field in relation to the rest of the field, players or objects. During the telecast of football games cameras tend to zoom in on the players which allows the viewer to only see a small portion of the field. Because the viewer can only see a small portion of the field a viewer may not know where a particular player is in relation to the pertinent locations on the field. One instance is when a player is carrying the football, the television viewer may not know how far that player has to run for a first down. One enhancement that would be helpful to television viewers of football games is to highlight the field at the point where a player must advance in order to obtain a first down.

An enhancement that would be helpful to viewers of golf tournaments is to highlight those portions of a golf course that have been notorious trouble spots to golfers. While the professional golfer is aware of these trouble spots and hits the ball to avoid those spots, the television viewer may not be aware of those trouble spots and may wonder why a particular golfer is hitting the ball in a certain direction. If the golf course was highlighted to show these trouble spots, a television viewer would understand the strategy that the golfer is using and get more enjoyment out of viewing the golf tournament. Another useful enhancement would include showing the contours of the green. Similar enhancements to the playing field would be useful in other sports as well.

Furthermore, live events do not take advantage of the scope of the television audience with respect to advertising. First, advertisements on display at a stadium can be televised; however, many of those advertisements are not applicable to the television audience. For example, a particular sporting event may be played in San Francisco and televised around the world. A local store may pay for a billboard at the stadium. However, viewers in other parts of the United States or in other countries receiving the broadcast may not have access to that store and, thus, the broadcast of the advertisement is not effective. Second, some of the space at a stadium is not used because such use would interfere with the view of the players or the spectators at the stadium. However, using that space for advertisement would be very effective for the television audience. For example, the glass around the perimeter of a hockey rink would provide an effective place for advertisements to the television audience. However, such advertisements would block the view of spectators at the stadium. Third, some advertisements would be more effective if their exposure is limited to particular times when customers are thinking of that type of product. For example, an advertisement for an umbrella would be more effective while it was raining.

Previous attempts to enhance the video presentation of live events have not been satisfactory. Some broadcasters superimpose advertisements on the screen; however, these advertisements tend to block the view of the event.

Another solution included digitizing a frame of video and using a computer with pattern recognition software to locate the target image to be replaced in the frame of video. When the target image is found, a replacement image is inserted in its place. The problem with this solution is that the software is too slow and cannot be effectively used in conjunction with a live event. Such systems are even slower when they account for occlusions. An occlusion is something that blocks the target. For example, if the target is a billboard on the boards around a hockey rink, one example of an occlusion is a player standing in front of the billboard. When that billboard is replaced, the new billboard image must be inserted into the video such that the player appears to be in front of the replacement billboard.

SUMMARY OF THE INVENTION

The present invention is dire to a system for enhancing the broadcast of a live event. A target, at a live event, is selected to be enhanced. Examples of targets include advertisements at a stadium, portions of the playing field (e.g., football field, baseball field, soccer field, basketball court, etc.), locations at or near the stadium, or a monochrome background (e.g. for chroma-key) positioned at or near the stadium. The system of the present invention, roughly described, captures video using a camera, senses field of view data for that camera, determines a position and orientation of a video image of the target in the captured video and modifies the captured video by enhancing at least a portion of the video image of the target. Alternative embodiments of the present invention include determining the perspective of the video image of the target and/or preparing an occlusion for the video image of the target.

One embodiment of the present invention includes one or more field of view sensors coupled to a camera such that the sensors can detect data from which the field of view of the camera can be determined. The field of view sensors could include pan, tilt and/or zoom sensors. The system also includes a processor, a memory and a video modification unit. The memory stores a location of the target and, optionally, data representing at least a portion of the video image of the target. The processor, which is in communication with the memory and the field of view sensors, is programmed to determine whether the target is within the field of view of the camera and, if so, the position of the target within a frame of video of the camera. Alternate embodiments allow for the processor to determine the position of the target in the frame of video using field of view data, pattern (or image) recognition technology, electromagnetic signals and/or other appropriate means. One exemplar embodiment uses field of view data to find a rough location of the target and then uses pattern recognition to find the exact location. Such a combination of field of view data with pattern recognition technology provides for faster resolution of the target's location than using pattern recognition alone.

The video modification unit, which is in communication with the processor, modifies the frame of video to enhance at least a portion of the video image of the target. That is, a target can be edited, highlighted, overlayed or replaced with a replacement image. For example, a video modification unit can be used to highlight a portion of a football field (or other playing field) or replace a first billboard in a stadium with a second billboard. Because the system can be configured to use pattern recognition technology and field of view sensors, the system can be used with multiple broadcast cameras simultaneously. Therefore, a producer of a live event is free to switch between the various broadcast cameras at the stadium and the television viewer will see the enhancement regardless of which camera is selected by the producer.

An alternate embodiment contemplates replacing either the field of view sensors and/or the pattern recognition technology with electromagnetic transmitters and sensors. That is, the target can be used to emit an electromagnetic signal. A sensor can be placed at the camera, or the camera can be used as a sensor, to detect the signal from the target in order to locate the target. Once the target is located within the video frame, the system can enhance the video image of the target. A further alternative includes treating the target with spectral coatings so that the target will reflect (or emit) a distinct signal which can be detected by a camera with a filter or other sensor.

These and other objects and advantages of the invention will appear more clearly from the following description in which the preferred embodiment of the invention has been set forth in conjunction with the drawings.

DETAILED DESCRIPTION

Figure 1:
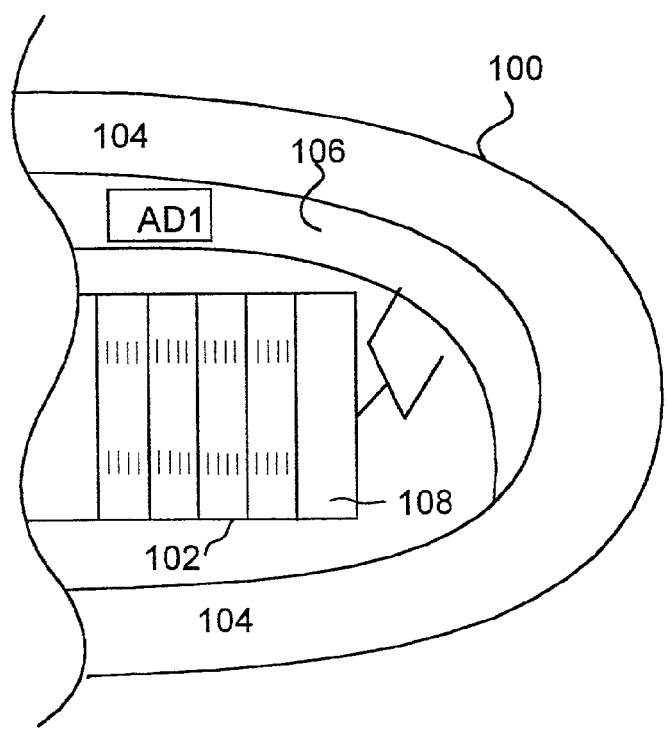
FIG. 1 depicts a perspective view of part of a football stadium.

FIG. 1 is a partial view of football stadium 100. In the center of stadium 100 is a football field 102. Surrounding football field 102 are the seats 104 for the fans. Between seats 104 and playing field 102 is a retaining wall 106. On retaining wall 106 is an advertisement AD1. For example purposes only, assume that a particular television broadcaster has selected four targets for enhancement. The first target is an advertisement AD1 to be replaced by another advertisement. The second target is a portion of the playing field which is to receive an advertisement. For this example, assume that the broadcaster wishes to place an advertisement in the end zone 108 of the football field. A third target is an area above the stadium. That is, the television broadcaster may wish that when a camera is pointed to the top of the stadium, the viewers sees an advertisement suspended above the stadium. A fourth target is a location on the playing field 102 representing where a team must cross in order to get a first down. Although the television broadcaster may be enhancing the video image as discussed above, the spectators and players at the stadium would not see any of these enhancements, rather they would view the stadium as depicted in FIG. 1.

Figure 2:
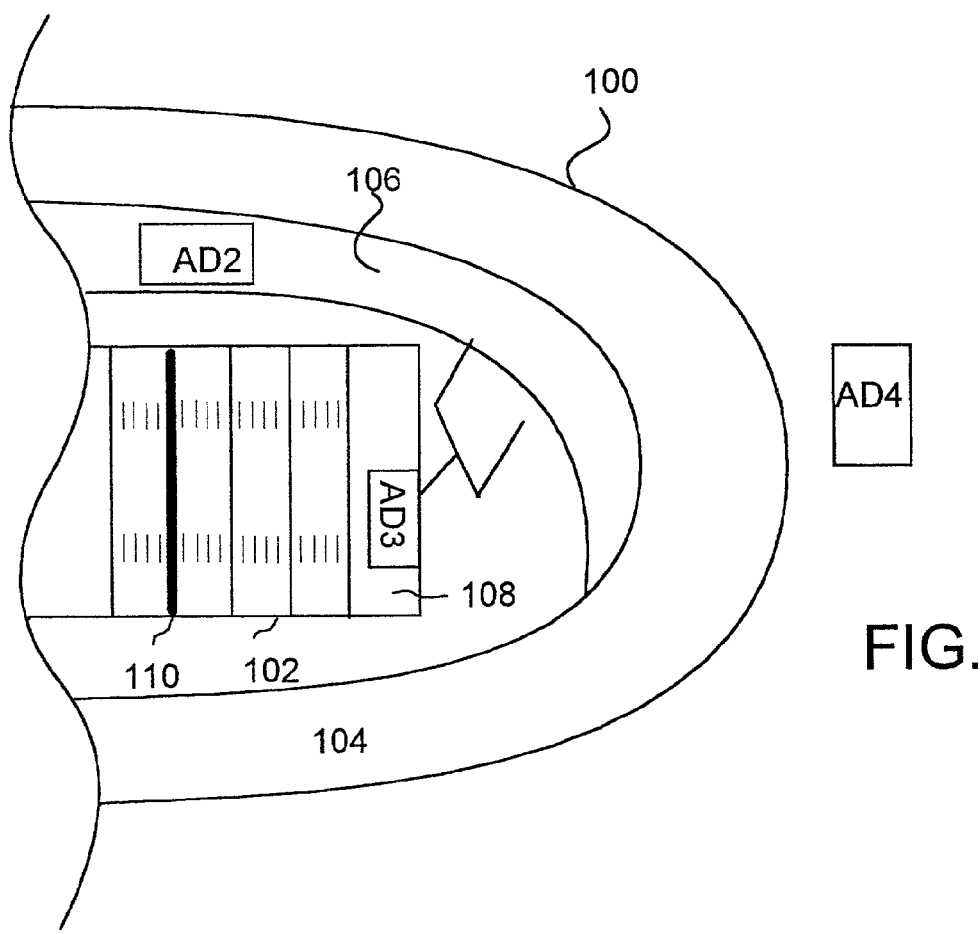
FIG. 2 depicts a perspective view of the football stadium of FIG. 1 as seen by a television viewer after the video has been enhanced.

FIG. 2 shows the view of FIG. 1, as seen by viewers watching the broadcast on television, after enhancements are made to the video. Advertisement AD2 is in the same location as advertisement AD1 was in FIG. 1. Thus, advertisement AD2 has replaced advertisement AD1. Advertisement AD3 is shown in end zone 108. Advertisement AD3 does not replace another advertisement because there was no advertisement in end zone 108 prior to the enhancement. FIG. 2 also shows advertisement AD4, which to the television viewer appears to be suspended above stadium 100. Also shown in FIG. 2 is a thick line 110 which represents the highlighting of the portion of the field at which the team who is offense must cross in order to get a first down at a particular moment during the game. In this particular example, the highlighting of the field consists of a bold thick line. Alternatives include different color lines, shading, using a blinking line, varying the brightness, etc. The enhancement need not be a line. The enhancement may also be any other shape or graphic that is appropriate. Thus, for purposes of this patent an enhancement includes editing an image, replacing part of an image with another image, overlaying all or part of an image, highlighting an image using any appropriate method of highlighting, or replacing an image with video.

Figure 3:
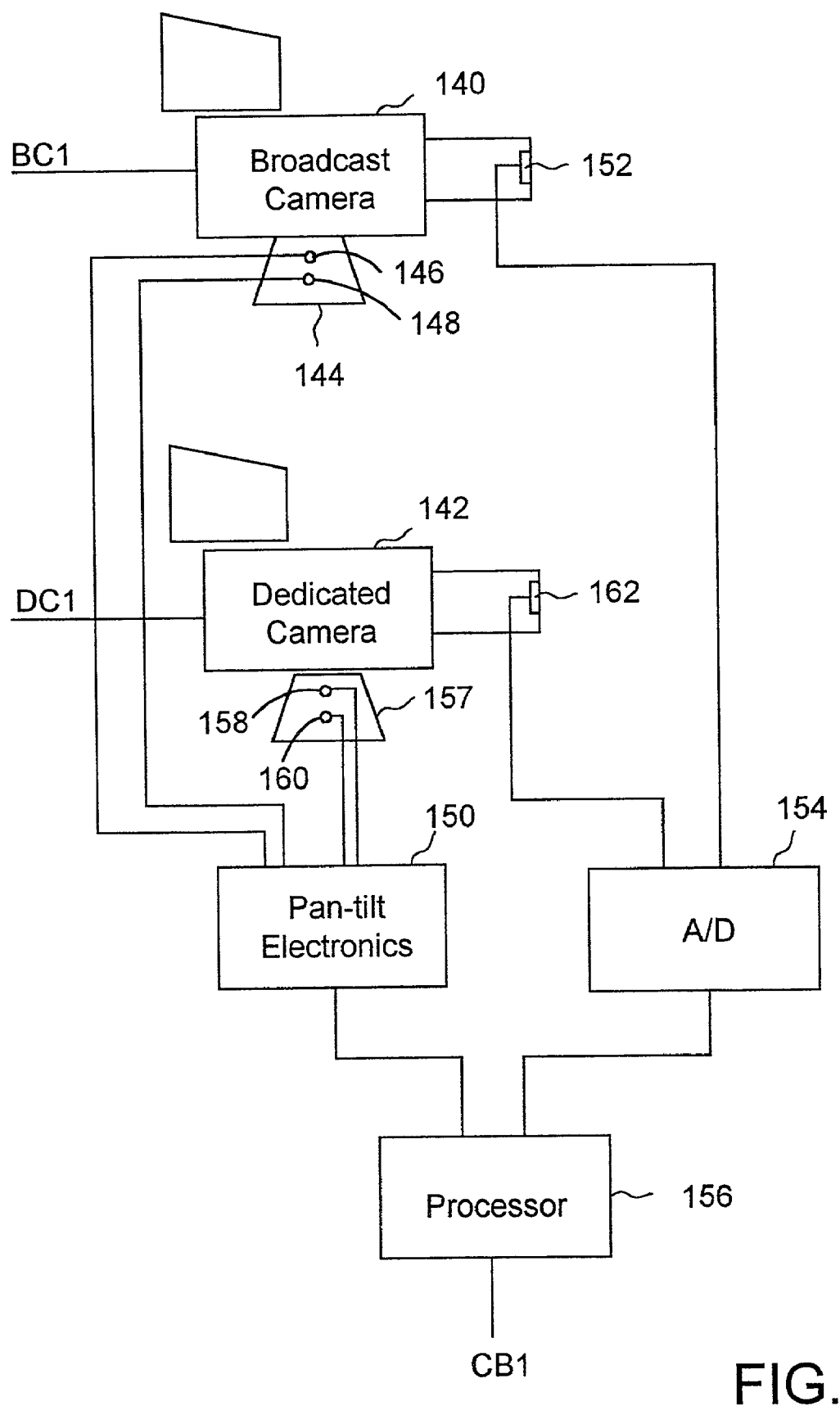
FIG. 3 depicts a block diagram of a subset of the components that make up the present invention.

FIG. 3 is a block diagram of a subset of the components that make up the present invention. The components shown on FIG. 3 are typically located at a camera bay in the stadium; however, they can be located in other suitable locations. Broadcast camera 140 captures a frame of video which is sent to a production center as shown by the signal BC1. Broadcast camera 140 has a zoom lens, including a 2× Expander (range extender). Connected to broadcast camera 140 is a 2× Expander/zoom/focus sensor 152 (collectively a "zoom sensor") which senses the zoom in the camera, the focal distance of the camera lense, and whether the 2× Expander is being used. The analog output of sensor 152 is sent to an analog to digital converter 154, which converts the analog signal to a digital signal, and transmits the digital signal to processor 156. One alternative includes using a zoom sensor with a digital output, which would remove the need for analog to digital converter 154. Broadcast camera 140 is mounted on tripod 144 which includes pan and tilt heads that enable broadcast camera 140 to pan and tilt. Attached to tripod 144 are pan sensor 146 and tilt sensor 148, both of which are connected to pan-tilt electronics 150. Alternatively, broadcast camera 140 can include a built-in pan and tilt unit. In either configuration, pan sensor 146, tilt sensor 148 and zoom sensor 152 are considered to be coupled to broadcast camera 140 because they can sense data representing the pan tilt, and zoom of broadcast camera 140.

Processor 156 is an Intel Pentium processor with supporting electronics; however, various other processors can be substituted. Processor 156 also includes memory and a disk drive to store data and software. In addition to being in communication with pan-tilt electronics 150 and analog to digital converter 154, processor 156 is in communication (via signal CB1) with a production center which is described below.

In one embodiment, pan sensor 146 and tilt sensor 148 are optical encoders that output a signal, measured as a number of clicks, indicating the rotation of a shaft. Forty thousand (40,000) clicks represent a full 360° rotation. Thus, a processor can divide the number of measured clicks by 40,000 and multiply by 360 to determine the pan or tilt angle in degrees. The pan and tilt sensors use standard technology known in the art and can be replaced by other suitable pan and tilt sensors known by those skilled in the relevant art. Pan/tilt electronics 150 receives the output of pan sensor 146 and tilt sensor 148, converts the output to a digital signal (representing pan and tilt) and transmits the digital signal to processor 156. The pan, tilt and zoom sensors are used to determine the field of view of the broadcast camera. Thus, one or more of the pan, tilt or zoom sensors can be labeled as a field of view senor(s). For example, if a camera cannot zoom or tilt, the field of view sensor would only include a pan sensor.

An alternative field of view sensor includes placing marks in various known locations in the stadium such that each mark looks different and at least one mark will always be visible to the camera while the camera is pointed at the relevant portions of the stadium. A computer using pattern recognition technology can find the mark in a frame of video and, based on the mark's size and position in the frame of video, determine more precisely the field of view and/or pan, tilt or zoom of the camera. A system can also be set up to use pan/tilt/zoom sensors in combination with the marks described above so that the pan/tilt/zoom can be used to make a rough estimate of where the camera is pointing and the mark is used to achieve a more accurate estimate. In such a combination system the marks need not look different if the placement of the marks is predetermined. Another alternative includes placing infrared emitters or beacons along the perimeter of the playing field or other portions of the stadium. A computer can determine an infrared sensor's field of view based on the location of the signal in the infrared sensor's frame of data. If the infrared sensor is mounted on a broadcast camera, determining the pan and tilt of the infrared sensor determines the pan and tilt of the broadcast camera plus a known offset. A more detailed discussion of using infrared technology, pan/tilt/zoom sensors, three dimensional location finding technology and video enhancement can be found in U.S. patent application Ser. No. 08/585,145, A System For Enhancing The Television Presentation Of An Object At A Sporting Event, incorporated herein by reference.

FIG. 3 shows a second and optional camera labeled as dedicated camera 142. Dedicated camera 142 is mounted on a tripod 157. In one embodiment, tripod 157 includes an optional pan sensor 158 and an optional tilt sensor 160, both of which are in communication with pan-tilt electronics 150. As will be explained below, in one embodiment the dedicated camera is set to one pan and tilt position; therefore, pan and tilt sensors are not needed. The output of dedicated camera 142 is the camera signal DC1, which is communicated to the production center described below. The present invention will perform its function without the use of dedicated camera 142; however, dedicated camera 142 improves the ability of the system to account for occlusions. Dedicated camera 142 should be located substantially adjacent to broadcast camera 140. That means that dedicated camera 142 should be as close as possible to broadcast camera 140 so that both will function properly yet their optical axes will be as close as practical. Thus, if both cameras are focused on the same object, their pan and tilt angle should be very similar. In various alternatives, each broadcast camera could be associated with more than one dedicated cameras. In order to further enhance performance, each broadcast camera would include a plurality of dedicated cameras, one dedicated camera for each potential target the broadcast camera will view.

Figure 4:
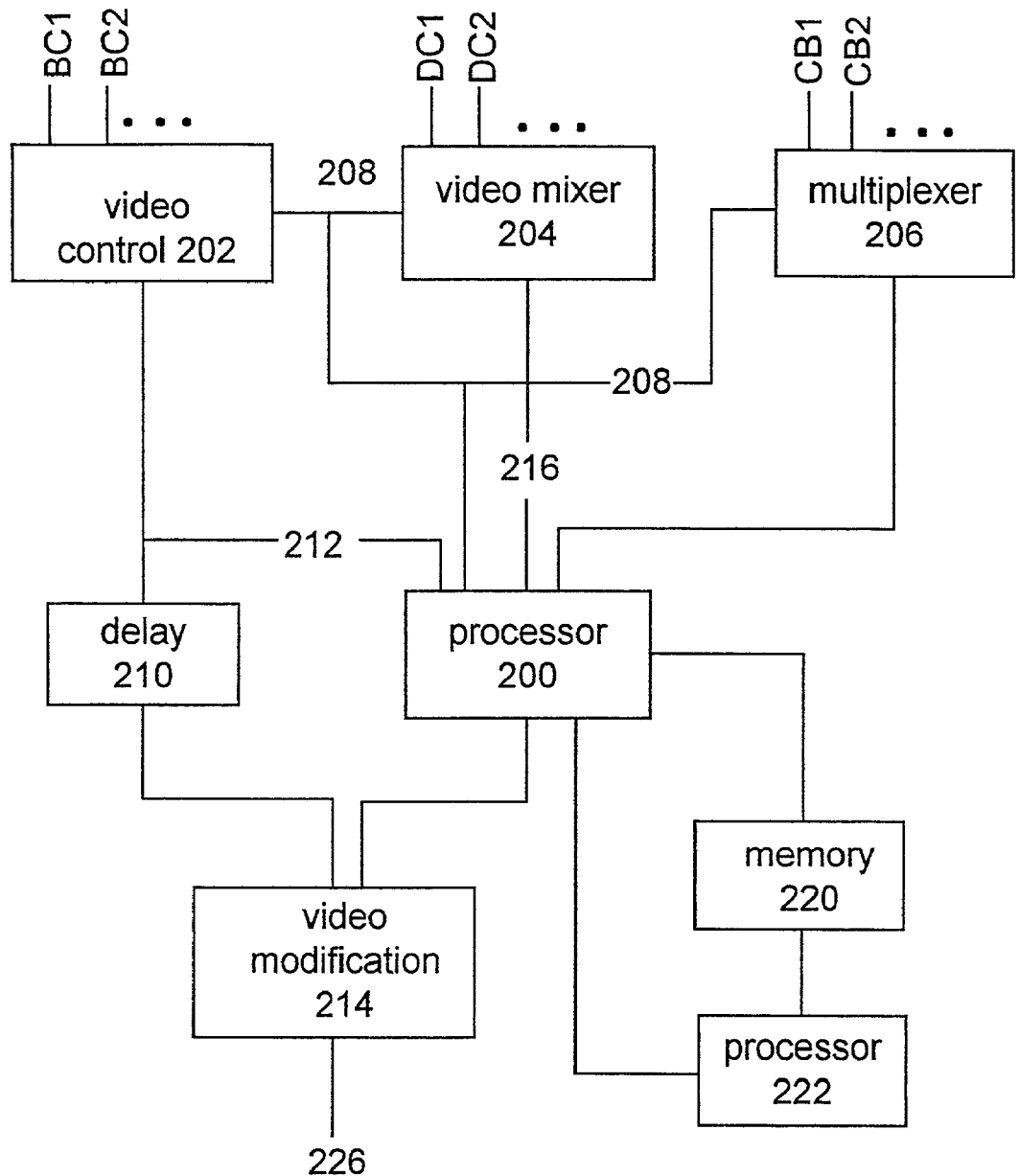
FIG. 4 depicts a block diagram of a subset of the components that make up the present invention.

FIG. 4 is a block diagram of the production center. Typically, the production center is housed in a truck parked outside of the stadium. However, the production center can be at a central office or the components of the production center can be spread out in multiple locations. The heart of the production center is processor 200. The preferred processor 200 is an Onyx computer from Silicon Graphics; however, various other suitable processors or combinations of processors can perform the necessary functions of the present invention. Processor 200 is in communication with video control 202, video mixer 204 and multiplexor 206. In one alternative, processor 200 includes more than one processor. For example, processor 200 could include two Onyx computers, one for locating the target and one for determining occlusions.

Broadcasters use many broadcast cameras at the stadium to televise a sporting event. The video signals from the various cameras are sent to video control 202 which is used to select one broadcast camera for transmission to viewers. One embodiment of video control 202 includes a plurality of monitors (one monitor for each video signal) and a selection circuit. A director (or manager, producer, etc.) can monitor the different video signals and choose which signals to broadcast. The choice would be communicated to the selection circuit which selects one camera signal to broadcast. The choice is also communicated to processor 200, video mixer 204 and multiplexer 206 via signal 208. The selected video signal is sent to delay 210 and processor 200 via analog to digital converter 212. If the broadcast camera is a digital camera, then there would be no need for analog to digital converter 212.

The output of delay 210 is sent to video modification unit 214. The purpose of delay 210 is to delay the broadcast video signal a fixed number of frames to allow time for processor 200 to receive data, determine the position of the target in the frame of video and prepare any enhancements. Although the video is delayed a small number of frames, the television signal is still defined as live. The delay introduced by the system is a small delay (under one second) which does not accumulate. That is, different frames of video are enhanced with the same small delay. For example, a ten frame delay is equivalent to one-third of a second, which is not considered a significant delay for television.

Video mixer 204 receives the video signals from all of the dedicated cameras. FIG. 4 shows signals DC1 and DC2. Signal DC1 is a dedicated camera associated with the broadcast camera BC1. If video control 202 selects BC1 then that selection is communicated to video mixer 204 which selects DC1. As discussed above, it is contemplated that some alternatives include having many dedicated cameras for one broadcast camera. For example, one broadcast camera may have four dedicated cameras. In that case, the dedicated cameras would be labeled DC1*a*, DC1*b*, DC1*c* and DC1*d*. When broadcast camera BC1 is selected, video mixer 204 would select up to all four dedicated cameras: DC1*a*, DC1*b*, DC1*c* and DC1*d*. The selected signal(s) from video mixer 204 is sent to analog to digital converter 216 which digitizes the video signal(s) and sends the digital signal(s) to processor 200.

Multiplexer 206 receives signals from the processors at each of the camera locations. For example, FIG. 4 shows multiplexer 206 receiving signal CB1 from processor 156 of FIG. 3. Each of the processor signals (CB1, CB2, . . . ) is associated with a broadcast camera. Thus, the selection by video control 202 is communicated to multiplexer 206 so that multiplexer 206 can send the corresponding signal to processor 200. The signal sent by multiplexer 206 to processor 200 includes the information from the field of view sensors. In one embodiment, processor 156 calculates the field of view and sends the resulting information, via multiplexer 206, to processor 200. In another embodiment, processor 200 receives the data via multiplexer 206 and determines the field of view. Either alternative is suitable for the present invention.

Processor 200 is connected to memory 220 which stores the locations of the targets and images of the targets (or at least partial images). Memory 220 also stores images of the replacement graphics, instructions for creating replacement graphics and/or instructions for highlighting, editing, etc. Memory 200 is loaded with its data and maintained by processor 222. The inventors contemplate that during operation of this system, processor 200 will be too busy to use compute time for loading and maintaining memory 220. Thus, a separate processor 222 is used to load and maintain the memory during operation. If cost is a factor, processor 222 can be eliminated and processor 200 will be used to load and maintain memory 220; however, for optimal performance memory 220 should be loaded, if possible, prior to the broadcast.

The images and locations of targets can be loaded into memory 220 either manually or automatically. For example, if the target's image and location are known in advance (e.g. an advertisement at the stadium) then prior to real-time operation of the system an operator can input the location of the target and scan in (or otherwise download) an image of the target. Alternatively, the operator can point one or more cameras at the target and use a mouse, light pen or other pointing device to select the target's image for storing in memory 220. The location of the target can be determined by physical measurement, using pan/tilt/zoom sensors, etc. If the target is not known in advance (for example if the target is the first down yard line) then the operator can select the target during operation using a pointing device and the system will download the image of the target and its location (using pan/tilt/zoom data) to memory 220. Alternatively, the system can be programmed to know that the target is one of a set of possible targets. For example, the system can be programmed to know that the target is a yard line and the operator need only input which yard line is the current target. The replacement graphics are loaded into memory after being digitized, downloaded or the replacement graphics can be created with processor 222. Instructions for highlighting or creating replacement graphics can be programmed using processor 222 or processor 200.

Processor 200 is connected to video modification unit 214. The output of video modification unit 214, labeled as signal 226, is the video signal intended for broadcast. This signal can be directly broadcast or sent to other hardware for further modification or recording. Video modification unit 214 modifies the video signal from delay 210 with the data/signal from processor 200. The type of modification can vary depending on the desired graphic result. One exemplar implementation uses a linear keyer as a video modification unit 214. When using a keyer, the signal from the video processor 200 to the keyer includes two signals: YUV and an external key (alpha). The YUV signal is called foreground and the signal from delay 210 is called background. Based on the level of the external key, the keyer determines how much of the foreground and background to mix to determine the output signal, from 100 percent foreground and zero percent background to zero percent foreground and 100 percent background, on a pixel by pixel basis. Alternatively, video modification unit 214 can be another processor or video modification unit 214 can be a part of processor 200.

In operation, processor 200 determines the field of view of the selected broadcast camera and checks memory 220 to see if any targets are within that field of view. If so, processor 200 then determines the exact position of the target in a frame of video by determining which pixels represent the target. Processor 200 then checks memory 220 for the replacement graphic or instructions to make a replacement graphic (or highlight). If the replacement strategy is to highlight a certain portion of a field, then memory 220 may include instructions for changing the color of a certain portion of the field, shading of a certain portion of the field, etc. Based on the pan, tilt and zoom, and the actual image of the target, processor 200 determines the size and orientation of the replacement graphic (also called mapping). In one embodiment, the enhancement includes processor 200 creating a frame of video with a graphic at the position of the enhancement. The frame created by processor 200 is sent to video modification unit 214 which combines the frame from processor 200 with the frame from delay 210. As will be described below, processor 200 is also used to account for occlusions. An alternate embodiment includes eliminating the separate video modification unit and using processor 200 to edit the video signal from the selected broadcast camera.

Figure 5:
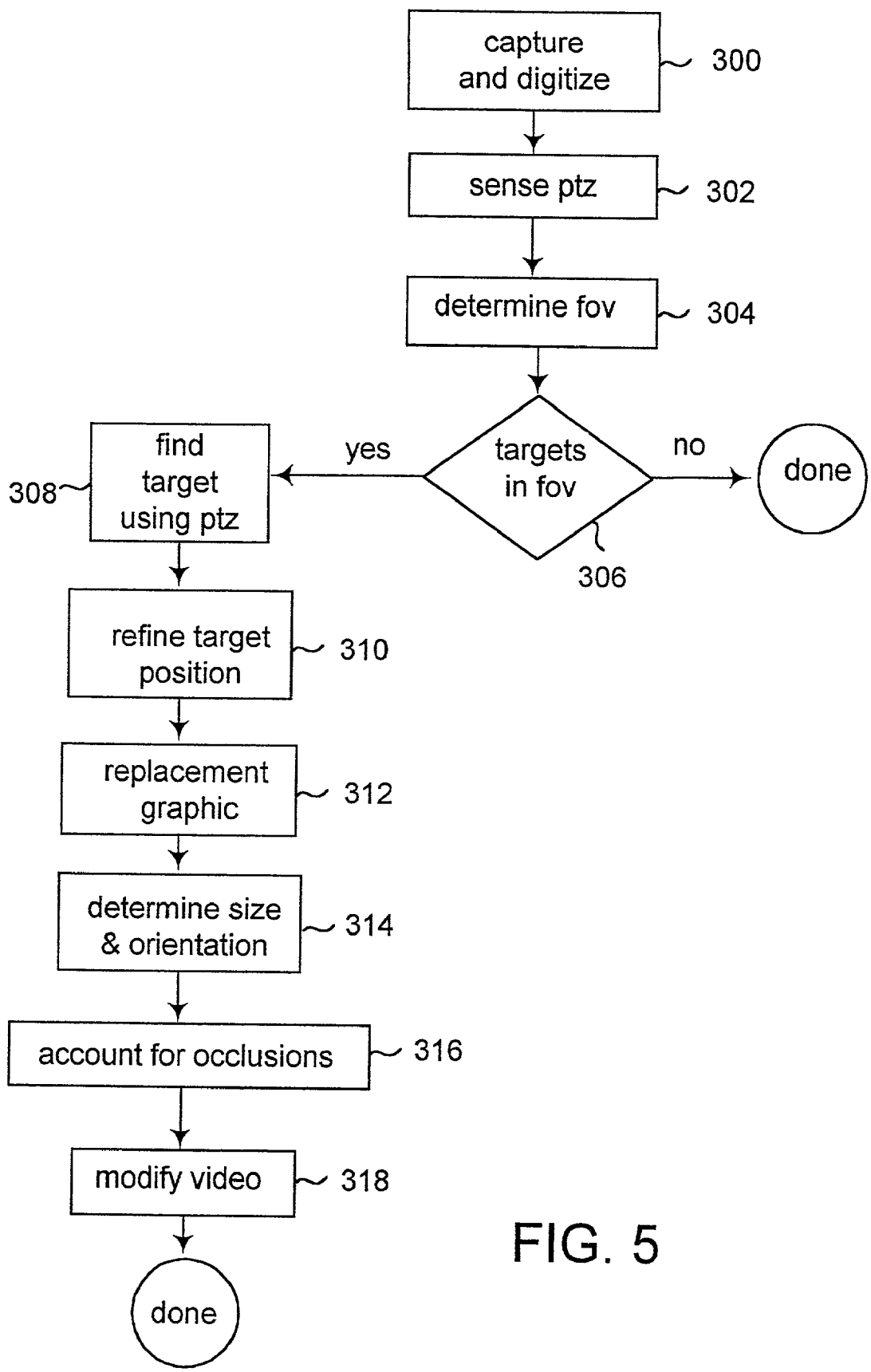
FIG. 5 is a flow chart describing the operation of the present invention.

FIG. 5 is a flow chart which explains the operation of the present invention. In step 300, video data is captured by a broadcast camera and is digitized. If the broadcast camera is a digital camera, digitizing is unnecessary. Simultaneously with step 300, pan, tilt and zoom data (field of view data) is sensed in step 302 and the field of view is determined in step 304. In step 306, processor 200 determines if any of the targets are within the field of view. Memory 200 (depicted in FIG. 4) includes a database. In one alternative, the database stores the three dimensional locations of all the targets. The field of view of a broadcast camera can be thought of as a pyramid whose location and dimensions are determined based on the field of view data. After determining the dimensions and locations of the pyramid, processor 200 accesses memory 220 to determine if any of the targets are within the pyramid. Step 306 is a quick method for determining if there is a target within the field of view of the camera. If not, the process is done and the system waits until the next frame of data. If there is a target within the field of view of the selected broadcast camera, then the exact position of the target must be determined within the frame of video of the selected broadcast camera.

Preferably, determining the position of the target is a two-step process. In the first step (step 308) a rough estimate is made based on the pan, tilt and zoom values and in the second step the estimate of the target's position is refined (step 310). In regard to step 308, by knowing where the camera is pointed and the target's three dimensional location, the target's position in the video frame can be estimated. The accuracy of step 308 is determined by the accuracy of the pan/tilt/zoom sensors, the software used to determine the field of view and the stability of the platform on which the camera is located. In some alternatives, the field of view sensor equipment may be so accurate that the position of the target is adequately determined and step 310 is not necessary. In other instances, the pan, tilt and zoom data only provides a rough estimate 308 (e.g a range of positions or general area of position) and step 310 is needed to determine a more accurate position.

Step 310 provides a more accurate determination of the target's position using pattern recognition techniques which are known in the art. Example of known pattern recognition and image processing technology can be found in the following documents: U.S. Pat. No. 3,973,239, Pattern Preliminary Processing System; U.S. Pat. No. 4,612,666, Automatic Pattern Recognition Apparatus; U.S. Pat. No. 4,674,125, Real-Time Hierarchal Pyramid Signal Processing Apparatus; U.S. Pat. No. 4,817,171, Pattern Recognition System; U.S. Pat. No. 4,924,507, Real-Time Optical Multiple Object Recognition and Tracking System and Method; U.S. Pat. No. 4,950,050, Optical Target Recognition System; U.S. Pat. No. 4,995,090, Optoelectronic Pattern Comparison System; U.S. Pat. No. 5,060,282, Optical Pattern Recognition Architecture Implementing The Mean-Square Error Correlation Algorithm; U.S. Pat. No. 5,142,590, Pattern Recognition System; U.S. Pat. No. 5,241,616, Optical Pattern Recognition System Utilizing Resonator Array; U.S. Pat. No. 5,274,716, Optical Pattern Recognition Apparatus; U.S. Pat. No. 5,465,308, Pattern Recognition System; U.S. Pat. No. 5,469,512, Pattern Recognition Device; and U.S. Pat. No. 5,524,065, Method and Apparatus For Pattern Recognition. It is contemplated that step 310 can use suitable technology other than pattern recognition technology.

In step 312, processor 200 fetches the replacement graphic from memory 220. If memory 220 is storing instructions for replacement graphics, then processor 200 fetches the instructions and creates the graphic. For example, creating the graphic can include drawing a highlight for the yard line of a football field. In step 314, processor 200 determines the size and orientation of the replacement image, and maps the replacement image to the video frame. Memory 220 merely stores one size image. Because of the pan, tilt and zoom of the broadcast camera, the image stored in memory 220 may need to be mapped to the video frame (e.g. magnified, reduced, twisted, angled, etc.). Processor 200 can determine the orientation based on the field of view data and/or the pattern recognition analysis in step 310. For example, by knowing where the broadcast camera is located and the pan, tilt and zoom of the broadcast camera, a computer can be programmed to figure how to map the replacement image or highlight on to the video frame.

In step 316, the system accounts for occlusions. If there is an object or person in front of the target, then the enhanced video should show the object or person in front of the replacement graphic, highlight, etc. In one embodiment, the system cuts out a silhouette in the shape of the object or person from the replacement image. Step 316 is discussed in more detail with respect to FIG. 6.

In step 318, the system modifies the video of the original broadcast camera. As discussed above, this could include creating a second frame of video which includes a replacement image and using a keyer to combine the second frame of video with the original frame of video. Alternatively, a processor can be used to edit the frame of video of the broadcast camera. It is possible that within a given frame of video there may be more than one target. In that case steps 308–318 may be repeated for each target, or steps 308–316 may be repeated for each target and step 318 be performed only once for all targets. Subsequent to step 318, the enhanced frame of video may be broadcast or stored, and the process (steps 300–318) may repeat for another frame of video.

Figure 6:
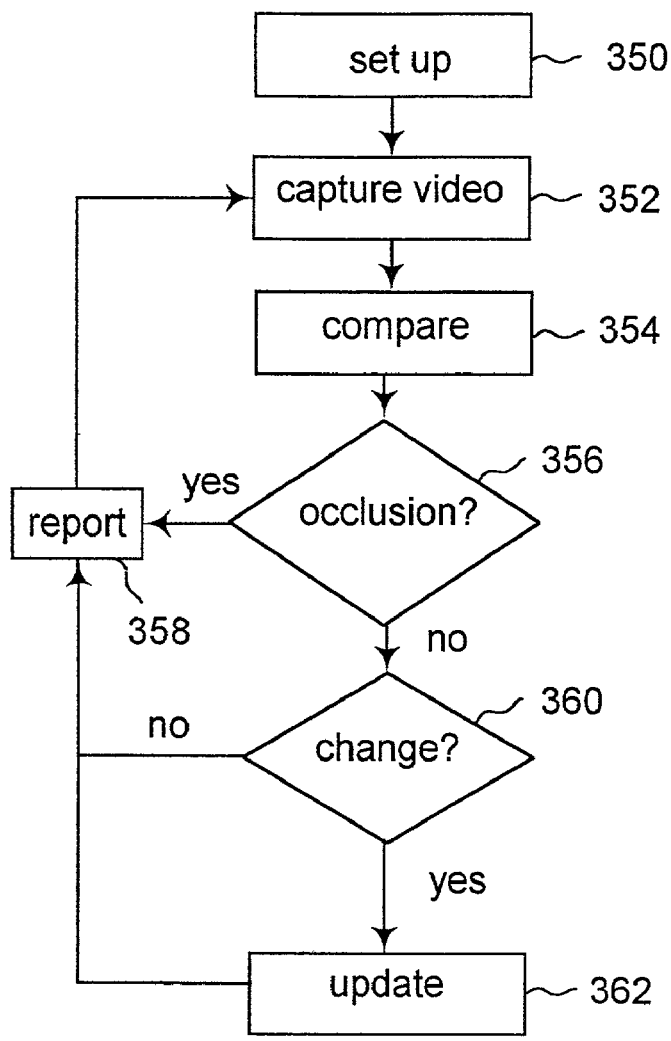
FIG. 6 is a flow chart which provides more detail of how the present invention accounts for occlusions.

FIG. 6 is a more detailed flow diagram explaining how the system accounts for occlusion. The steps described in FIG. 6 are performed by a system which includes one or more dedicated cameras (e.g. dedicated camera 142). Step 350, is performed before the live event occurs. In one embodiment, there is a dedicated camera substantially adjacent to a broadcast camera for each target that the broadcast camera may view. For example, if there are three advertisements which are to be replaced in the stadium and a particular camera can view two of those advertisements, then the system can include two dedicated cameras substantially adjacent to that particular camera. Prior to the game, a dedicated camera is pointed directly at one of the targets; the camera is zoomed in such that the target fills a substantial portion of the dedicated camera's frame of video; and the image of the target is stored in memory 220. A substantial portion means that the target typically appears to cover over half of the frame of video of the dedicated camera. For optimal results, the dedicated camera should be zoomed in such that the target fills the greatest amount of the frame of video possible while remaining completely within the frame of video, unless it is desired to have clues of the scenery surrounding the target. After the dedicated camera is pointed at the target, its pan, tilt and zoom should remain fixed.

Once the television broadcast of the live event begins, steps 352–362 are repeated for each frame where the occlusion analysis is desired. In step 352, a video image is captured and digitized by the dedicated camera. Simultaneously, a video image is captured by the broadcast camera. In step 354, the digitized image from the dedicated camera is compared to the stored image of the target. The stored image is stored in memory 220. The processor knows which stored image to compare with from step 306 of FIG. 5. The step of comparing could include altering one of the images such that both images are the same size and orientation, and then subtracting the data. Alternatively, other methods can be used to compare. If there is an occlusion blocking the target (step 356), then the two images will be significantly different and, in step 358, an occlusion will be reported. In reporting the occlusion, the system reports the presence of an occlusion and the coordinates of the occlusion. When performing step 354, it is possible that there is no occlusion; however, the two images are not exactly the same. The differences between the images must meet a certain minimum threshold to be considered an occlusion. If the differences are not great enough to be an occlusion, then in step 360 the system determines that the differences are due to ambient conditions in the stadium. For example, if the lights have been dimmed then the captured image of the target may appear darker. Weather conditions could also have an effect on the appearance of the target image. If small differences are detected in step 360 that do not meet the threshold for occlusions, then the system "learns" the changes to the target by updating the stored image of the target to reflect the new lighting or weather conditions (step 362). For example, the new stored image of the target may be darker than the original image. Subsequent to step 362 the system performs the report step 358 and reports that no occlusion was found.

An alternative to the method of FIG. 6 includes comparing the target image from the broadcast camera to the stored image. However, using the broadcast camera is not as advantageous as using a dedicated camera because it is likely that the broadcast camera would not be zoomed to the image. Thus, the target image is likely to be smaller on the broadcast camera than it will on the dedicated camera. Because there is a small image to work with, the system loses the subpixel accuracy obtained from the dedicated camera. Also, using a separate dedicated camera may increase the speed at which the system accounts for occlusions.

Figure 7:
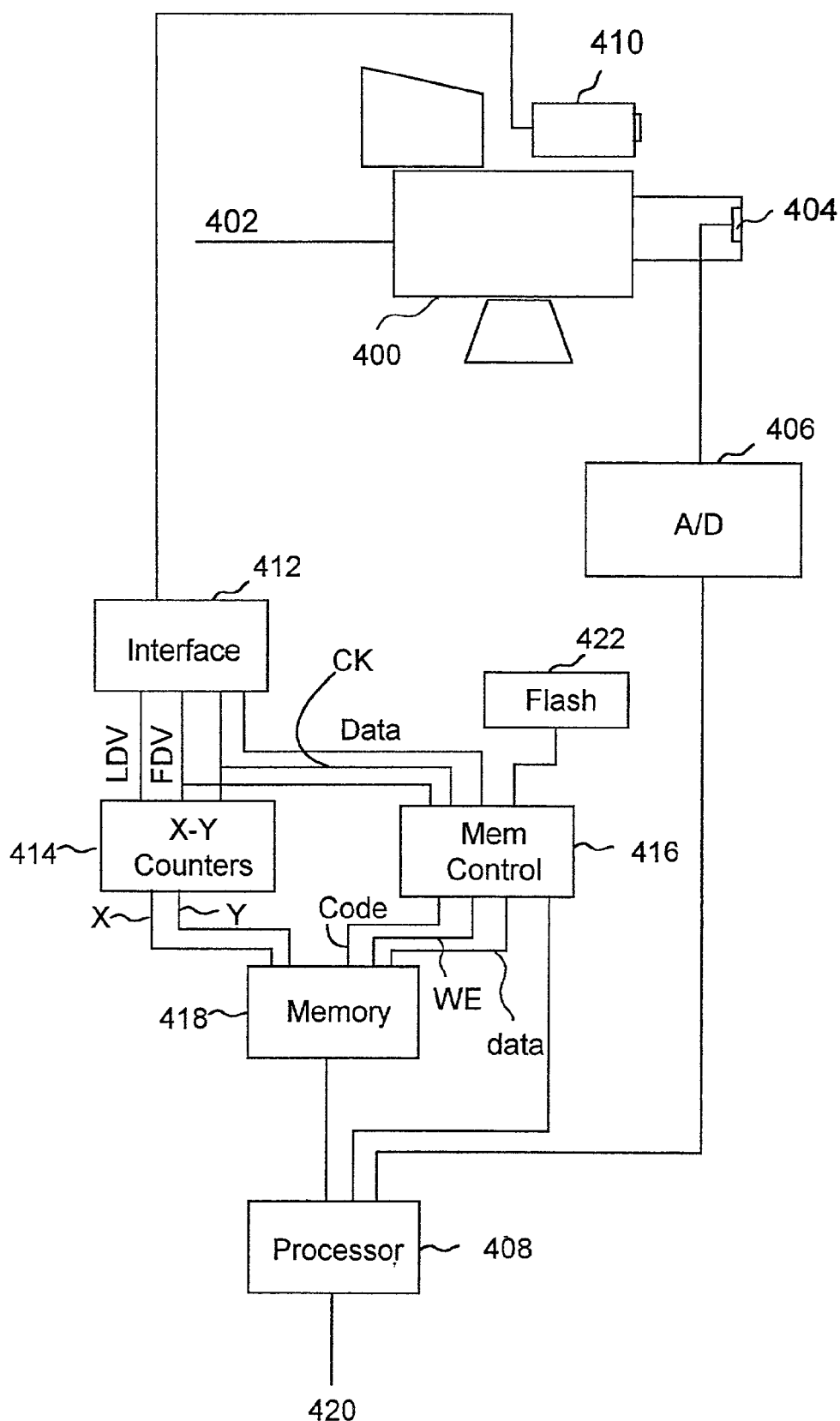
FIG. 7 is a partial block diagram of an alternate embodiment of the present invention.

FIG. 7 shows an alternative embodiment of the present invention which utilizes electromagnetic transmitting beacons at or near a target. The beacons transmit an electromagnetic signal not visible to the human eye. Electromagnetic waves include light, radio, x-rays, gamma rays, microwave, infrared, ultraviolet and others, all involving the propagation of electric and magnetic fields through space. The difference between the various types of electromagnetic waves are in the frequency or wave length. The human eye is sensitive to electromagnetic radiation of wave lengths from approximately 400–700 nm, the range called light, visible light or the visible spectrum. Thus, the phrase "electromagnetic signal not visible to a human eye" means an electromagnetic wave outside of the visible spectrum. It is important that the signal transmitted from the beacon is not visible to human eye so that the visual appearance of the target will not be altered to those people attending the live event. In one embodiment, the beacon is an electromagnetic transmitter which includes infrared emitting diodes. Other sources which transmit electromagnetic waves may also used, for example, radio transmitters, radar repeaters, etc.

FIG. 7 shows a broadcast camera 400 which outputs a video signal 402. Broadcast camera 400 includes a zoom lens coupled to a zoom detector 404. The output of zoom detector 404 is transmitted to analog to digital converter 406 which sends the digital output to processor 408. Mounted on top of broadcast camera 400 is sensor 410. In the embodiment which utilizes an infrared emitter as a beacon, sensor 410 is an infrared sensor. Sensor 410 is mounted on top of broadcast camera 400 so that the optical axis of sensor 410 is as close as possible to the optical axis of broadcast camera 400. It is also possible to locate sensor 410 near broadcast camera 400 and account for differences between optical axes using matrix transformations or other suitable mathematics.

One example of an infrared sensor is a progressive scan, full frame shutter camera, for example, the TM-9701 by Pulnix. The Pulnix sensor is a high resolution 768(H) by 484(V) black and white full frame shutter camera with asynchronous reset capability. The camera has an eight bit digital signal output and progressively scans 525 lines of video data. A narrow band infrared filter is affixed in front of the lens of the Pulnix sensor. The purpose of the filter is to block electromagnetic signals that are outside the spectrum of the signal from the beacon. The sensor captures a frame of video (data) which comprises a set of pixels. Each pixel is assigned a coordinate corresponding to an x-axis and a y-axis. The sensor data includes an eight bit brightness value for each pixel, which are scanned out pixel by pixel to interface 412 along with other timing information. Interface 412 outputs four signals: LDV, FDV, CK and DATA. LDV (line data valid) is transmitted to X-Y counters 414 and indicates that a new line of valid data is being scanned out of sensor 410. FDV (frame data valid) which is transmitted to X-Y counters 414 and memory control 416, indicates that valid data for the next frame is being transmitted. CK (pixel clock) is a 14.318 MHZ clock from sensor 414 sent to X-Y counters 414 and memory control 416. X-Y counters 414 counts X and Y coordinates sequentially in order to keep track of the location of the pixel whose data is being scanned in at the current time. When LDV is inserted, the X counter is reset. When FDV is inserted, the Y counter is reset.

The signal Data includes the eight bit data value for each pixel. As data is read from sensor 410, memory control 416 determines whether the pixels meets a brightness threshold. That is, noise and other sources will cause a large number of pixels to receive some data. However, the pixels receiving the signal from the beacon will have at least a minimum brightness level. This brightness threshold is set in a register (not shown) which can be set by processor 408. If the data for a particular pixel is above the brightness threshold, memory control 416 sends a write enable (WE) signal to memory 418, causing memory 418 to store the X and Y coordinates of the pixel, the data for that pixel and a code for that pixel. The code indicates that the data is valid data, a new frame, end of frame or a flash. Processor 408 can read the data from memory 418 and process the data locally or transmit the data to the production center (e.g., to multiplexer 206).

Many arenas do not allow photographers to use flashes on their cameras in order to prevent impairing a player's vision from random flashes during a sporting event. In lieu of individual camera flashes, many arenas install a set of strobe flashes at or near the ceiling of the arenas and provide for communication between each photographer's camera and the set of strobe flashes. When the photographer takes a picture, the strobe flashes emit a flash of light, which may include an electromagnetic wave in the infrared spectrum. In one embodiment, the system avoids using incorrect data due to sensors detecting a flash by using filters. A second embodiment connects a signal from a strobe flash to a computer which causes the system to ignore data sensed during a flash. A third embodiment includes using flash detectors. The flash detector can be located anywhere in the arena suitable for sensing a strobe flash. FIG. 7 shows flash detector 422 which detects a flash and sends a signal to memory control 416. Flash detector 422 includes a photo detector which can comprise, at least, a photo diode and an opamp. In front of the photo detector would be a filter that allows detection of signals in a spectrum that includes the signals emitted by the beacon. Connected to the opamp are components which can detect pulse edges.

Figure 8:
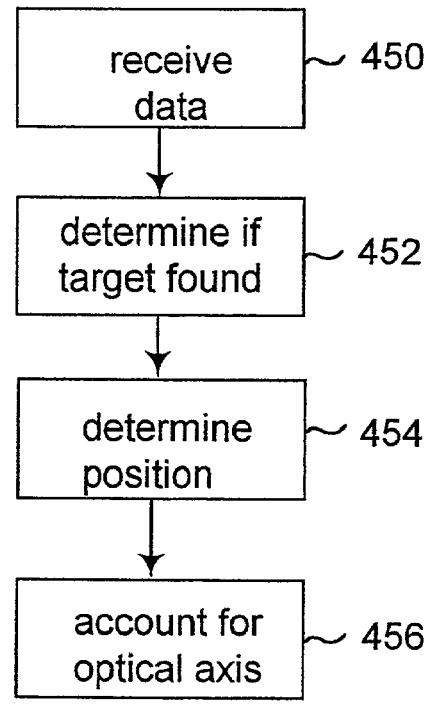
FIG. 8 is a partial flow chart describing the operation of the alternate embodiment depicted in FIG. 7.

The embodiment described in FIG. 7 operates similar to the embodiment described in FIG. 3. Some of the differences between the operation of the two embodiments are depicted in FIG. 8. Similar to the embodiment in FIG. 3, the embodiment in FIG. 7 first captures and digitizes video data. In step 450, infrared data is received. In step 452, the system determines whether a target is found in the infrared data by monitoring the data stored in memory 418. Since memory control 416 only allows data above a threshold to be stored in memory 418, if a given frame of data from a sensor has pixel data stored in memory then a target is found. If a sensor is detecting false targets, then various error correction methods known in the art can be utilized. In step 454, the position of the target is determined in the frame of video by reading the X and Y coordinates stored with the pixel data in memory 418. Step 456 fine tunes the determined position information of the target to account for the error from the camera's platform or pan/tilt/zoom sensors. One alternative for accounting for the difference in optical axis is to use a transformation matrix; however, other mathematical solutions known in the art are also suitable. After step 456, the system can perform steps 312 through 318 as described with respect to FIG. 5, however, any field of view data used is based on the size and position of the beacon's signal in the sensor's frame of video.

A further alternative of FIG. 7 includes using polarization. That is the infrared filter on sensor 410 is replaced or augmented with a polarized filter. A target to be replaced (e.g., a billboard) is treated with a spectral coating that allows only polarized light to reflect off the billboard. The filter and spectral coating are designed such that light reflecting off the billboard to sensor 410 will be completely blacked-out. The pixels that represent the position of the target in the sensor's frame of video will have a brightness value of zero or close to zero. Thus, memory control 416 is used to only store memory that has a brightness value of zero or below a threshold level.

The foregoing detailed description of the invention has been presented for purposes of illustration and description. It is not intended to be exhaustive or to limit the invention to the precise form disclosed, and obviously many modifications and variations are possible in light of the above teaching. The described embodiments of the system for enhancing the broadcast of a live event were chosen in order to best explain the principles of the invention and its practical application to thereby enable others skilled in the art to best utilize the invention in various embodiments and with various modifications as are suited to the particular use contemplated. The invention is, thus, intended to be used with many different types of live events including various sporting events and nonsporting events. It is intended that the scope of the invention be defined by the claims appended hereto.

What is claimed is:

1. A method for enhancing the broadcast of a target at a live event, comprising the steps of:
    capturing a first frame of video using a first camera;
    capturing a second frame of video using a second camera, said second frame of video including said target;
    determining if said target is within said first frame of video;
    determining a position and orientation of said target in said first frame of video;
    detecting an occlusion of said target in said second frame of video;
    determining where said detected occlusion is positioned in said first frame of video at least partially based on said step of detecting; and
    modifying said first frame of video by enhancing said target in said first frame of video without enhancing said detected occlusion.

2. A method according to claim 1, wherein:
    said second camera is pointed at said target and is located substantially adjacent said first camera;
    said step of detecting an occlusion includes comparing at least a portion of said second frame of video to an unoccluded image of said target.

3. A method according to claim 2, wherein:
    said second camera is zoomed such that said target fills a substantial portion of said second frame of video.

4. A method for adding a graphic indication of a first down to a broadcast of a football game during said broadcast of said football game, comprising:
    storing an indication of a location on a football field, said location corresponding to said first down;
    sensing field of view data for a camera using one or more field of view sensors that do not use image pattern recognition;
    receiving video from said camera; and
    adding a line to said video using image pattern recognition and said one or more field of view sensors that do not use image pattern recognition, said adding said line includes determining said location's position in said video using said field of view data and inserting said line into said video at said location's position in said video, said step of inserting includes determining whether said video includes an occlusion of said location's position using image pattern recognition, said step of inserting includes adding said line to one or more portions of said video that are not occluded and not adding said line to one or more portions of said video that are occluded.

5. An apparatus for adding a graphic indication of a first down to a broadcast of a football game during said broadcast of said football game, comprising:
    one or more field of view sensors associated with a camera, said one or more field of view sensor do not use image pattern recognition;
    a storage device; and
    one or more processing units in communication with said storage device and said one or more field of view sensors, said storage device stores data for said one or more processing units, said one or more processing units capable of performing a method comprising:
        storing an indication of a location on a football field, said location corresponding to said first down,
        receiving field of view data from said one or more field of view sensors;
        receiving video from said camera, and
        adding a line to said video using image pattern recognition and said one or more field of view sensors that do not use image pattern recognition, said adding said line includes determining said location's position in said video using said field of view data and inserting said line into said video at said location's position in said video, said step of inserting includes determining whether said video includes an occlusion of said location's position using image pattern recognition, said step of inserting includes adding said line to one or more portions of said video that are not occluded and not adding said line to one or more portions of said video that are occluded.

6. A method for adding a graphic indication of a first down to a broadcast of a football game during said broadcast of said football game, comprising the steps of:
    storing an indication of a location on a football field, said location corresponding to said first down;
    sensing field of view data for a camera using one or more field of view sensors that do not use image pattern recognition;
    receiving video from said camera;
    determining said location's position in said video using a first step process that makes use of said field of view data;
    performing a second step process to refine said position's location in said video, said second step process uses image pattern recognition;
    adding a line to said video at said location's position in said video.

* * * * *